Oct. 16, 1962 — M. A. WINTERS ETAL — 3,058,837
CURING OXIDIZED HYDROCARBON POLYMER FILMS
Filed May 8, 1959

Merilyn A. Winters
Ober C. Slotterbeck
Donald F. Koenecke
Walter L. Van Nostrand, Jr.
INVENTORS

BY
PATENT ATTORNEY

# 3,058,837
CURING OXIDIZED HYDROCARBON POLYMER FILMS

Merilyn A. Winters, Westfield, Ober C. Slotterbeck, Rahway, and Donald F. Koenecke, Westfield, N.J., and Walter L. Van Nostrand, Jr., Staten Island, N.Y., assignors to Esso Research and Engineering Company, a corporation of Delaware
Filed May 8, 1959, Ser. No. 811,846
21 Claims. (Cl. 106—285)

This invention relates to liquid coating compositions comprising an air-blown polymer of butadiene-1,3, tetrachlorophthalic anhydride with or without phosphoric acid or toluene sulfonic acid and methods of making the same.

It is known to prepare films from liquid polymers of diolefins or copolymers of such diolefins with monomers copolymerizable therewith. These films have been cured by air drying or baking in an oven for about 30 minutes at 300°–350° F. However, it has not been possible to cure relatively thick films (more than 1.5 mils in thickness) of these oils with any degree of satisfaction.

Recently it has been found that reasonably thick films (1.5 to 3 mils) can be cured provided the oil is first oxidized to contain 10 to 20% oxygen by blowing with the air or oxygen at a temperature between 20° and 280° F. in the presence of a solvent. However, such oils even in the presence of a drier require at least 3 to 4 days to air dry.

In accordance with the present invention, it has now been found that films of air-blown polymers of butadiene-1, 3 can be cured in a reasonable time either by air drying or low temperature baking by adding a small amount of an anhydride of a polybasic mononuclear aromatic acid to the air-blown oil, preparing the film and curing to give hard, chemically resistant coatings of excellent clarity and high impact strength. Specific anhydrides include phthalic anhydride, tetrachlorophthalic anhydride, hemimellitic anhydride, trimellitic anhydride, prehnitic anhydride, mellophanic anhydride, pyromellitic anhydride an mellitic anhydride. In some instances the unsubstituted anhydride may be insoluble in the oxidized polymer oil. In such cases it will be necessary to add solubilizing groups to the molecule. For example, phthalic anhydride is insoluble in the oxidized polymer but is tetrachloro substitution product is soluble and hence is the compound that is used. The solubilizing group is immaterial. It is used merely to make the anhydride compatible in the system. These films are particularly advantageous in making white enamels. It has been found that with certain pigments in the white to yellow range some discoloration is noted when the films are cured at high temperature, e.g. 300°–350° F. Therefore, it has been difficult to get a white enamel which will not discolor at these high temperatures. However, with the addition of 1 to 2 weight percent tetrachlorophthalic anhydride, for example, to the pigmented resins, the films can be baked at 150°–275° F. for 5 to 30 minutes instead of 300°–350° F. In this way, the color of the original pigment is preserved and the same physical properties obtained. If colored pigments are used, discoloration is not so important and higher temperatures up to 350° F. may be employed with increased hardness.

In accordance with another ambodiment of this invention it has also been found that the impact strength of the film containing any of the above anhydrides can be unexpectedly increased to very high values by the further addition of small amounts of phosphoric acid or of toluene sulfonic acid.

Another desirable use of coating compositions based on a polymer of butadiene-1,3 is as a protective interior lining of tin cans used in food packaging. In the manufacture of such interiorly coated tin cans, the polymer coating is applied and cured on a ferrous metal sheet, ordinarily applying the coating to one side of the metal sheet only. The resulting coated metal sheet is stamped or cut into appropriate container parts which are subsequently fabricated as interiorly lined metal containers (tin cans) wherein the coated surface of the metal sheet provides the interior surface of the container. Containers interiorly protected in this manner with suitable organic coatings are used for packaging aqueous wet-pack food products and beverages which ordinarily are heat-processed or pasteurized in the container in direct contact with the protective organic coating.

Although these food-packaging containers are usually designated as tin cans, the metal substrate used in the manufacture of these containers ordinarily is a ferrous metal sheet having a very thin surface coating of tin. The tin is applied by electrolytic plating or by hot-dipping and the surface coating of tin ordinarily corresponds to about .25 pound of tin per 218 square feet of metal sheet surface and may range up to about 1.5 pounds of tin on said basis. This coating of tin is not adequately protective for use in packaging many wet-pack food products. Hence, protection of the surface must be enhanced by superimposing an adequate organic coating on the tin-coated metal substrate. Suitable organic coatings ordinarily are adequately protective when used at a coating weight corresponding to 2 to 10 milligrams of dry weight coating per square inch of coated metal surface. This coating weight is desirably applied in a single coat. The compositions described above additionally containing phosphoric acid or toluene sulfonic acid have been found to be extremely useful for protecting the interior of containers and have been found to stand up exceptionally well in the can-forming operation and in the processing of foods in direct contact with the coating.

In applying the invention composition to ferrous metal substrates, such as tin-plated sheet steel, sheet steel, terneplate and aluminum clad steel, the coating after substantial volatile loss of solvent is cured by heating the coated substrate preferably at an approximate temperature of 385° F. for a period of 5 to 15 minutes. Other temperatures in the range of 250° F. to 420° F. can be used to equivalently cure the coatings by correspondingly altering the heating or baking period in the range of about 60 to 5 minutes. A curing temperature as low as about 200° F. is operative but a long curing time at this temperature ordinarily is impractical for commercial operations. Use of curing temperatures above 420° F. up to the decomposition temperature does not permit a significant reduction in curing time below the indicated 5 minutes preferred minimum. In the presence of metallic driers, the coatings will air-dry or cure to a track-free state, but the coatings are preferably cured by baking. Heating can be accomplished by any of the conventional means used in the coating industry.

The liquid coating compositions can be applied by any of the conventional methods employed by the coating industry. However, for coating of sheet metal used in container fabrication, roller coating is a preferred method as the desired coating weight is easily and conveniently applied in a single coat and the liquid coating can be applied at a non-volatile content as high as about 70% by weight. For general coating purposes spraying, dipping and flow-coating are also useful methods of application.

The preferred coating weight for coating ferrous metal sheet substrates with an adequately protective organic coating for use as an interior coating of containers used in the packaging of wet-pack food products is in the range of 2 to 8 milligrams of dry coating per square inch of surface. At coating weights lower than 2 milligrams per square inch the coating ordinarily is not sufficiently protective and not adequately fracture-resistant to either the mechanical operations of container fabrication or the conditions associated with heat-processing food products in direct contact with the coating on the interior surface of the container. No significant advantages are recognized in applying as an interior coating for food containers fabricated from tin-plated sheet steel a coating weight greater than 8 milligrams per square inch of surface. Coating weights greater than 8 milligrams per square inch can be used when the clear or pigmented products serve as a general purpose decorative and protective coating applied either as a single coat or as multiple coats to a ferrous metal substrate. In the general utility of the coatings, they can represent either the entire surface coating on the substrate or at least one layer of a composite surface coating consisting of a plurality of layers. For example, the coating can be applied as the primer coat directly on the substrate and at least one conventional top-coat finish applied thereover or a conventional coating can be used as the undercoat with the invention composition used as the top-coat finish.

The accompanying drawings illustrate utility of the invention coating compositions as a can coating wherein.

Figure 1:
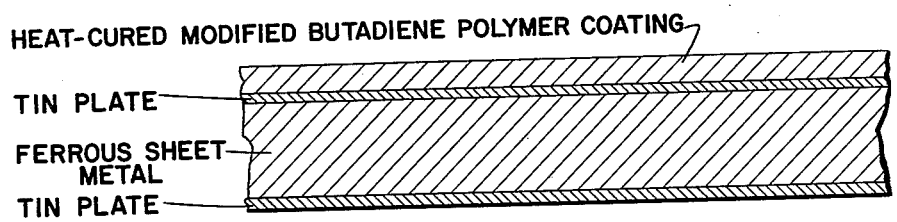
FIG. 1 is a cross-sectional view of a flat sheet of tin-plated ferrous sheet metal of the type used in the fabrication of tin cans, the metal substrate having a heat-cured coating thereon comprising butadiene polymer and the additives of this invention.
Figure 2:
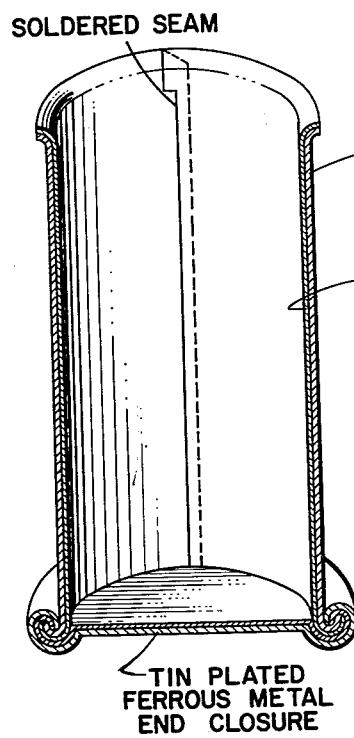
FIG. 2 is a cross-sectional view of a tin can consisting of a cylindrical body shell and an end-closure sealed thereto; the body shell, being fabricated from the pre-coated sheet metal described in FIG. 1 and having the heat-cured coating as an interior lining or base coat.
Figure 3:
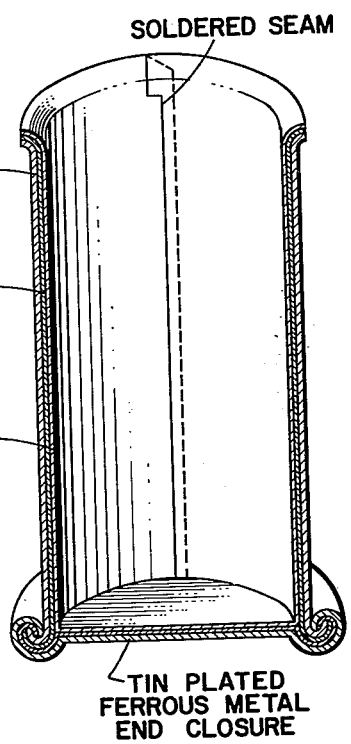
FIG. 3 is a cross-sectional view of a tin-can corresponding to the article in FIG. 2 further having a heat-cured super-imposed coating comprising a butadiene polymer and the additives of this invention, the top coat being applied after the seam of the base-coated body shell was soldered and an end-closure was sealed to one end of the body shell.

The synthetic oils to which the present invention are applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 5–30% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight-run mineral spirits boiling between 150° and 200° C. (Varsol), 3 parts of tertiary butyl hydroperoxide (60% pure) and 0.75 part of diisopropyl zanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight-run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol-treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about $-15°$ and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium are used per 100 parts of monomers, sodium particle sizes below 100 microns being particularly effective.

The blowing of the above polymeric drying oils with air or oxygen is best carried out in a solvent of moderate to good solvency, e.g., solvents or solvent mixtures having a kauri-butanol value of at least 40. At least a substantial portion of aromatic solvent is generally needed to secure such a K.B. value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low K.B. value solvents are generally useful, the oil can be dissolved in strong solvents from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri-butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso-100 (a mixture of aromatic hydrocarbons boiling from about 150° to 175° C.), Solvesso-150 (a mixture of aromatic hydrocarbons boiling from about 190° to 210° C.), or mixtures thereof. Other suitable solvents include the Varsols which are straight-run mineral spirits boiling in the range of 140° to 205° C., having API gravities of 40 to 55 and varying in aromatic content from 5 to 35 weight percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalyst, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to this invention, the desired anhydride is dissolved in a volatile hydrocarbon solvent such as toluene, benzene, solvent naphtha, Varsol, Solvesso-100, Solvesso-150 and the like, and added to the oxidized oil described above. The amount of anhydride added is fairly small, 1 to 2% based on the oxidized oil usually being sufficient. However, if the amount is increased to 3 to 20% the hardness of the films can be increased by increasing the time of cure, or the temperature of cure, or both.

Improved film properties can be obtained by the addition of cross-linking agents or promoters to the oxidized polymer prior to curing. Unexpectedly high impact resistance of the films can be obtained by the addition of up to 1–3% of phosphoric acid or toluene sulfonic acid. Other reagents include a class of poly-functional compounds, such as polyamines, urea or phenolic formaldehyde resins and diisocyanates. Suitable resins include the melamine-formaldehyde resin known to the trade as Uformite MM46 (Rohm and Haas). Films containing from 10 to 15% of this are extremely mar resistant and can be baked at lower temperatures. This resin is prepared by reacting three molecules of formaldehyde with one molecule of melamine in accordance with methods known in the art (see, for example, U.S. Patent 1,633,337). The half-blocked isocyanate prepared from trimethylol propane and tolylene diisocyanate, wherein only one of the isocyanate radicals is reacted, is particularly effective for increasing film hardness values.

The following specific examples are presented to illustrate the effects of the present invention. All quantities are expressed in this specification and claims on a weight basis unless stated otherwise.

*Example I*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: benzene-100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poises at 50% N.V.M. in Varsol solution and the non-volatile portion thereof had an average molecular weight of about 3,000.

The polymer oil thus obtained was dissolved in Solvesso-150 (a substantially 100% aromatic hydrocarbon cut boiling 365°–415° F.) to make a 35% N.V.M. solution. It was then blown with air at about 230° F. until the oxygen content reached 16%. A product containing 10% oxygen was also prepared.

*Example II*

Various amounts of tetrachlorophthalic anhydride were added to the blown oil containing 16% oxygen of Example I. Films of the resulting blends were then laid down on sheet steel panels by means of a draw gage and the films cured by air-drying, oven-baking for 15 minutes at 160°, 200°, and 215° F. The data obtained are shown in Table I.

These data show that considerably harder films can be obtained by curing in the presence of tetrachlorophthalic anhydride as compared to films omitting this material. These coatings may be used for internal pipecoating, external pipecoatings, e.g. as primers, tank and drum linings, etc. Because of the excellent clarity of the films (they exhibit no discoloration after either air-drying or baking at moderately high temperatures), the coatings could also be used for furniture finishes and other applications where a clear coating is desirable.

*Example III*

The oxidized oil used in Example II was mixed with 4.3% tetrachlorophthalic anhydride and made into an enamel with 20 vol. percent of $TiO_2$ pigment. Films having a thickness of 1.4 mils were laid down on panels. These panels were baked at 275° F. for 15 minutes and the film found to have a hardness of 46 (Sward).

TABLE I

| Weight percent tetra-chlorophthalic anhydride (based on oxidized oil solids) | Cure | Thickness (mils) | Sward hardness (days) | | | | | Chemical resistance [1] | | | |
|---|---|---|---|---|---|---|---|---|---|---|---|
| | | | 1 | 2 | 3 | 4 | 8 | $H_2O$ (5 hr.) | Grease (2 hr.) | Soap (2 hr.) | 1% NaOH (1 hr.) |
| 2.1 | Air dry | 1.1 | 4 | | | 8 | 10 | | | | |
| 2.1 | 15′ at 200° F | 1.7 | 30 | | | 36 | 36 | | | | |
| 4.3 | Air dry | 1.6 | 2 | | | 8 | 8 | | | | |
| 4.3 | 15′ at 200° F | 2.0 | 30 | | | 34 | 34 | | | | |
| 6.4 | Air dry | 1.6 | 4 | | | 8 | 10 | | | | |
| 6.4 | 15′ at 200° F | 1.8 | 30 | | | 40 | 40 | | | | |
| 10.0 | Air dry | 0.9 | 8 | | | 16 | 16 | | | | |
| 10.0 | 15′ at 200° F | 1.6 | 42 | | | 46 | 48 | | | | |
| 14.2 | Air dry | 2.4 | | 4 | | | | | | | |
| 14.2 | 15′ at 160° F | 2.4 | | | 12 | | 18 | 0 | 0 | 1 | 0 |
| 14.2 | 15′ at 200° F | 2.2 | 40 | | | | 40 | 0 | 0 | 0 | 0 |
| 17.8 | Air dry | 1.5 | | 8 | | | | | | | |
| 17.8 | 15′ at 160° F | 1.5 | | | 22 | | 52 | 0 | 0 | | 0 |
| 17.8 | 15′ at 200° F | 2.2 | 44 | | | 46 | 60 | 0 | 0 | 0 | 0 |
| Control [2] | Air dry | 1.5 | | | | 4 | | | | | |
| Do.[2] | 15′ at 200° F | 1.9 | | | | 14 | | | | | |
| Do.[2] | 30′ at 215° F | 0.95 | | | | 12 | | 3 | 0 | 0 | 1 |

[1] Ratings: 0 (unaffected), 1–3 (discolored and less adhesion), 4–6 (softened), 7–9 (failure by removal of film).
[2] Synthetic drying oil without the addition of tetrachlorophthalic anhydride.

*Example IV*

The oxidized oil used in Example II was mixed with 5% of tetrachlorophthalic anhydride and 15% of a final stage melamine-formaldehyde resin known in the trade as Uformite MM46. This mixture was made into an enamel with 20 vol. percent of $TiO_2$ pigment and laid down on a steel panel as a film having a thickness of 3.2 mils. The panels were baked for 10 minutes at 300° F. and the film found to have a Sward hardness of 44 and were mar resistant.

*Example V*

The oxidized oil used in Example II was mixed with 4.3% of tetrachlorphthalic anhydride and made into an enamel with 20 vol. percent $TiO_2$ pigment. A drier was added (0.02% cobalt naphthenate) and the enamel laid down on a steel panel as a film having a thickness of 2.6 mils. The panel was baked for 15 minutes at 275° F. and the film found to have a hardness of 40 Sward.

*Example VI*

The oxidized oil used in Example II was mixed with 5% tetrachlorophthalic anhydride and 10% of the melamine-formaldehyde resin of Example III and formed into an enamel with 20 vol. percent of $TiO_2$ pigment. This enamel was laid down on a steel panel as a film having a thickness of 2.0 mils. After baking for 5 minutes at 260° F., it was found to be mar resistant and had a Sward hardness of 32.

*Example VII*

Various amounts of tetrachlorophthalic anhydride (TCPA), trimellitic anhydride (TMA), alone and together with 1% of phosphoric acid ($H_3PO_4$) and toluene sulfonic acid (TSA) were added to the oxidized oil of Example I containing 10% oxygen. The mixtures were placed on an agitator wheel in a closed bottle and allowed to mix overnight. Films were cast by drawing down the solution on steel panels (Q) with wire wound rods. The coatings were cured at 300° and 350° F. for different time intervals. The resultant coatings were tested for physical properties, particularly impact strength, and compared with various other addition agents. The results are shown in Table II.

Examples III, IV and V show that extremely hard films can be formed by the composition of the present invention, particularly if a melamine-formaldehyde resin is added to the recipe. The films containing the resin are particularly interesting in that they show up as completely mar resistant. Example VII shows the improved results obtained by the addition of either phosphoric acid or toluene sulfonic acid to the tetrachlorophthalic or trimellitic anhydride, the compositions containing phosphoric acid being particularly resistant to impact, both direct and reverse.

TABLE II

| Coating | | Film properties | | | |
|---|---|---|---|---|---|
| Composition of vehicle | Cure | Film [1] thickness | Sward [2] hardness | Impact [3] | |
| | | | | Direct | Reverse |
| Oxidized oil | 20′ at 350° F | 1.05 | 50 | 50 | 15 |
| Oxidized oil plus 1% $H_3PO_4$ | do | 0.95 | 40 | 80 | 50 |
| Oxidized oil plus 10% tetrachlorophthalic anhydride (TCPA) | do | 1.05 | 48 | 60 | 25 |
| Oxidized oil plus 1% $H_3PO_4$ plus 10% TCPA | do | 1.00 | 52 | 160 | 90 |
| Oxidized oil plus 10% tetrachlorobisphenol-A [4] | do | 0.95 | 56 | 50 | 5 |
| Oxidized oil plus 15% melamine resin | do | 0.95 | 30 | 45 | 10 |
| Oxidized oil plus 1% tri-ethyl phosphate | do | 1.35 | 38 | 70 | 5 |
| Oxidized oil plus 2% tri-ethyl phosphate | do | 1.15 | 50 | 30 | 5 |
| Oxidized oil plus 1% tri-phenyl | do | 1.35 | 44 | 45 | 20 |
| Oxidized oil plus 2% tri-phenyl | do | 1.30 | 48 | 55 | 25 |
| Oxidized oil plus 1% tri-cresyl phosphate | do | 1.40 | 44 | 25 | 10 |
| Oxidized oil plus 2% tri-cresy phosphate | do | 1.45 | 38 | 30 | 5 |
| Oxidized oil plus 1% di-methyl phosphate | do | 1.00 | 56 | 40 | 0 |
| Oxidized oil plus 2% di-methyl phosphate | do | 1.00 | 54 | 50 | 50 |
| Oxidized oil plus 1% di-butyl phosphate | do | 1.10 | 46 | 25 | 0 |
| Oxidized oil plus 2% di-butyl phosphate | do | 1.05 | 44 | 40 | 5 |
| Oxidized oil plus 10% short oil alkyd | do | 1.05 | 30 | 35 | 5 |
| Oxidized oil plus 20% short oil alkyd | do | 1.10 | 30 | 30 | 0 |
| Oxidized oil plus 10% medium oil alkyd | do | 1.00 | 50 | 30 | 10 |
| Oxidized oil plus 20% medium oil alkyd | do | 0.95 | 46 | 35 | 5 |
| Oxidized oil plus 1% $H_3PO_4$ plus 10% short oil alkyd | do | 1.00 | 42 | 30 | 0 |

See footnotes at end of table.

TABLE II—Continued

| Coating | | Film properties | | | |
|---|---|---|---|---|---|
| Composition of vehicle | Cure | Film thickness [1] | Sward hardness [2] | Impact [3] | |
| | | | | Direct | Reverse |
| Oxidized oil plus 1% H₃PO₄ plus 20% short oil alkyd | 20' at 350° F | 1.05 | 40 | 35 | 0 |
| Oxidized oil plus 1% H₃PO₄ plus 10% medium oil alkyd | do | 0.95 | 44 | 45 | 10 |
| Oxidized oil plus 1% H₃PO₄ plus 20% medium oil alkyd | do | 1.00 | 40 | 65 | 15 |
| Oxidized oil | 30' at 300° F | 1.05 | 32 | 20 | 0 |
| Oxidized oil plus 1% H₃PO₄ | do | ~1.00 | 28 | 40 | 0 |
| Oxidized oil plus 10% TCPA | do | 1.00 | 54 | 70 | 25 |
| Oxidized oil plus 1% H₃PO₄ plus 10% TCPA | do | ~1.00 | 32 | 160 | 140 |
| Oxidized oil plus 10% tetrachlorobisphenol-A [4] | do | 1.05 | 56 | 35 | 10 |
| Oxidized oil plus 15% melamine resin | do | 0.90 | 18 | 80 | 15 |
| Oxidized oil (pigmented) [5] | 20' at 350° F | 1.05 | 28 | 40 | 5 |
| Oxidized oil (pigmented) plus 1% H₃PO₄ | do | 1.00 | 30 | 45 | 10 |
| Oxidized oil (pigmented) plus 10% TCPA | do | 0.95 | 32 | 35 | 0 |
| Oxidized oil (pigmented) plus 1% H₃PO₄ plus 10% TCPA | do | 1.00 | 22 | 75 | 45 |
| Oxidized oil (pigmented) plus 1% H₃PO₄ | 30' at 300° F | 1.00 | 32 | 30 | 0 |
| Oxidized oil (pigmented) plus 10% TCPA | do | 1.00 | 44 | 25 | 0 |
| Oxidized oil (pigmented) plus 1% H₃PO₄ plus 10% TCPA | do | ~1.00 | 20 | 80 | 65 |
| Oxidized oil | 10' at 350° F | 0.95 | 14 | 30 | 5 |
| Do | 20' at 350° F | 0.95 | 62 | 25 | 5 |
| Do | 30' at 350° F | 0.95 | 58 | 35 | 10 |
| Oxidized oil plus 5% TMA | 10' at 350° F | 1.00 | 30 | 80 | 25 |
| Do | 20' at 350° F | 1.00 | 46 | 80 | 45 |
| Do | 30' at 350° F | 1.00 | 54 | 60 | 10 |
| Oxidized oil plus 2.5% TMA | 10' at 350° F | 1.00 | 40 | 55 | 15 |
| Do | 20' at 350° F | 1.00 | 54 | 80 | 25 |
| Do | 30' at 350° F | 1.00 | 58 | 70 | 15 |
| Oxidized oil plus 5% TMA plus 1% H₃PO₄ | 20' at 350° F | 1.00 | 38 | 160 | 160 |
| Do | 30' at 350° F | 1.00 | 62 | 80 | 60 |
| Oxidized oil plus 2.5% TMA plus 1% H₃PO₄ | 20' at 350° F | 1.00 | 66 | 160 | 110 |
| Do | 30' at 350° F | 1.00 | 66 | 120 | 100 |
| Oxidized oil | 20' at 300° F | 1.05 | 14 | 20 | <5 |
| Do | 30' at 300° F | 1.05 | 32 | 20 | <5 |
| Oxidized oil plus 5% TMA | do | 1.0 | 44 | 35 | 10 |
| Oxidized oil plus 2.5% TMA | do | 1.0 | 48 | 35 | <5 |
| Oxidized oil plus 5% TMA plus 1% H₃PO₄ | do | 1.0 | 36 | 160 | 120 |
| Do | 20' at 300° F | 0.95 | 22 | 160 | 80 |
| Oxidized oil plus 2.5% TMA plus 1% H₃PO₄ | do | 1.0 | 16 | 160 | 80 |
| Do | 30' at 300° F | 1.0 | 26 | 160 | 140 |
| Oxidized oil plus 5% TMA plus 1% TSA | do | 1.05 | 46 | 130 | 70 |
| Oxidized oil plus 2.5% TMA plus 1% TSA | do | 1.15 | 44 | 130 | 35 |

[1] In mils.
[2] In percent, based on plate glass=100.
[3] In inch-pounds, films withstand tabulated impact without visible cracking.
[4] Tetrachloro-4,4'-isopropylidene diphenol.
[5] Pigment=15% Fe₂O₃ volume concentration.

Example VIII

The compositions prepared in accordance with Example VII were applied by draw down guage to one surface of a sheet of .50 electrolytically tin-plated steel, that is, the sheet steel had a tin plating thereon corresponding to a .50 pound of tin to about 218 square feet of metal surface. After partially drying by volatile loss of solvent from the wet coating, the coated sheet was heated in an oven for ten minutes at 400° F. The sheet metal stock coated with the cured product was stamped into can ends. These can ends were examined visually for eyeholes and then half immersed in an aqueous solution containing 20% by weight of CuSO₄·5H₂O, 10% by weight of concentrated hydrochloric acid, and 70% by weight of distilled water. Metal exposure as a result of the crimping in forming the can end is observed by black or coppery deposits. Each end was rated by comparison with standards in use in the paint and coatings industry for rating enamel coatings in accordance with the code where 100 represents no failures and 0 represents complete failure. A rating of 85 or better is considered acceptable by the industry.

The ends were further evaluated by means of the pack test. The lids are sealed, with a can-closing machine, onto cans containing various foodstuffs. The cans are inverted so that the foods contact the test coatings and then the cans are processed in a pressure cooker at 5–15 lbs. steam pressure (250° F.) for 10–100 minutes, depending upon the foodstuff. After cooling, the coated lids are cut off on a lathe so as to avoid destroying any of the test area on the covers. Failure of the can coating most generally occurs at the countersink area of the covers—which is the area around the circumference where the tinplate is subjected to the most severe bend during punching operations. Failures are rated by observing this area through a 30× microscope. Numerical ratings are made from 0=unaffected to 4=complete failure, with a rating of 2 being considered on the borderline of acceptability. Adhesion of the film to the flat surfaces of the can cover is tested by scratching a cross through the coating immediately after opening the processed food cans. Scotch tape is pressed firmly over the area and quickly ripped off. If poor in adhesion, the coating is pulled off the tinplate.

The data in Table III clearly show the improvements to be obtained by the present invention. There are very few imperfections to be found in the fabricated coating before processing when any of the additives of the present invention are used. The combination of phosphoric acid and tetrachlorophthalic anhydride gives particularly good results. After processing the oxidized polymer itself shows up badly but each of the other additives give excellent results. The average of three tests (shown in detail in Table III) of each of the additives are as follows:

```
                                                      Average
                                                       CuSO₄
                                                       Rating
Oxidized oil plus H₃PO₄-------------------------------- 89
Oxidized oil plus H₃PO₄ plus trimellitic anhydride---- 93
Oxidized oil plus H₃PO₄ plus tetrachlorophthalic an-
  hydride --------------------------------------------- 92
Oxidized oil plus toluene sulfonic acid plus tetrachlo-
  rophthalic anhydride-------------------------------- 92
Control ----------------------------------------------- 73
```

TABLE III

| Resin | Baking conditions | | Thickness | Sward hardness | Eye-holes | CuSO4 before pack test | CuSO4 after pack test |
|---|---|---|---|---|---|---|---|
| | Time, min. | Temp., °F. | | | | | |
| Oxidized polymer | 10 | 400 | 0.36 | 56 | 1 | 85 | -------- |
| Oxidized polymer plus A | 10 | 400 | 0.35 | 66 | 1 | 93 | -------- |
| Oxidized polymer plus A+B | 10 | 400 | 0.35 | 64 | 0 | 95 | -------- |
| Oxidized polymer plus A+C | 10 | 400 | 0.38 | 58 | 0 | 98 | -------- |
| Oxidized polymer plus B+D | 10 | 400 | 0.35 | 64 | 0 | 93 | -------- |
| Oxidized polymer | 8 | 400 | 0.36 | 46 | -------- | -------- | 85 |
| Do | 10 | 380 | 0.37 | 58 | -------- | -------- | 70 |
| Do | 8 | 380 | 0.37 | 48 | -------- | -------- | 65 |
| Oxidized polymer plus A | 8 | 400 | 0.34 | 48 | -------- | -------- | 83 |
| Do | 10 | 380 | 0.36 | 46 | -------- | -------- | 90 |
| Do | 8 | 380 | 0.35 | 50 | -------- | -------- | 93 |
| Oxidized polymer plus A+B | 8 | 400 | 0.35 | 60 | -------- | -------- | 95 |
| Do | 10 | 380 | 0.33 | 62 | -------- | -------- | 93 |
| Do | 8 | 380 | 0.36 | 58 | -------- | -------- | 90 |
| Oxidized polymer plus A+C | 8 | 400 | 0.33 | 58 | -------- | -------- | 93 |
| Do | 10 | 380 | 0.33 | 56 | -------- | -------- | 92 |
| Do | 8 | 380 | 0.34 | 48 | -------- | -------- | 90 |
| Oxidized polymer plus B+D | 7 | 400 | 0.30 | 40 | -------- | -------- | 90 |
| Do | 8 | 400 | 0.29 | 48 | -------- | -------- | 90 |
| Do | 10 | 380 | 0.35 | 60 | -------- | -------- | 95 |
| Do | 8 | 380 | 0.35 | 60 | -------- | -------- | 92 |

NOTE.—A—$H_3PO_4$, B—Trimellitic anhydride, C—Tetrachlorophthalic anhydride, D—Toluene sulfonic acid.

Since each of the additives give $CuSO_4$ ratings well above the 85 accepted by industry as the standard, it is obvious that these coatings are eminently suited for coating the interior of cans to be used for processed foods.

This application is a continuation-in-part of Serial No. 705,498, filed December 27, 1957, now U.S. Patent No. 2,983,698.

The nature of the present invention having been thus fully set forth and specific examples of the same given, what is claimed as new and useful and desired to be secured by Letters Patent is:

1. A process for improving the hardness of films prepared from oxidized liquid polymers of butadiene-1,3 having been air blown to incorporate 10 to 20% oxygen in its structure which comprises adding 1–20% of an anhydride of a polybasic mononuclear aromatic acid selected from the group consisting of phthalic anhydride, tetrachlorophthalic anhydride, hemimellitic anhydride, trimellitic anhydride, prehnitic anhydride, mellophanic anhydride, pyromellitic anhydride, and mellitic anhydride which is soluble in said oxidized hydrocarbon.

2. Process according to claim 1 in which the anhydride is tetrachlorophthalic anhydride.

3. Process according to claim 1 in which the anhydride is trimellitic anhydride.

4. Process according to claim 1 in which 1–3% of phosphoric acid is added to the polymer-anhydride mixture.

5. Process according to claim 2 in which 1–3% of phosphoric acid is added to the polymer-anhydride mixture.

6. Process according to claim 3 in which 1–3% of phosphoric acid is added to the pollymer-anhydride mixture.

7. Process according to claim 3 in which 1–3% of toluene sulfonic acid is added to the polymer-anhydride mixture.

8. A composition of matter comprising a mixture of an oxidized liquid polymer of butadiene-1,3 having been air blown to incorporate 10 to 20% oxygen in its structure and 1–20% of an anhydride of a polybasic mononuclear aromatic acid selected from the group consisting of phthalic anhydride, tetrachlorophthalic anhydride, hemimellitic anhydride, trimellitic anhydride, prehnitic anhydride, mellophanic anhydride, pyromellitic anhydride, and mellitic anhydride, said composition being capable when laid down as a film on a surface of curing to a hard, clear, chemically resistant coating having exceptionally high direct and reverse impact strength.

9. Composition of matter according to claim 8 in which the anhydride is tetrachlorophthalic anhydride.

10. Composition of matter according to claim 8 in which the anhydride is trimellitic anhydride.

11. Composition of matter according to claim 8 in which 1–3% of phosphoric acid is added to the polymer-anhydride mixture.

12. Composition of matter according to claim 9 in which 1–3% of phosphoric acid is added to the polymer-anhydride mixture.

13. Composition of matter according to claim 10 in which 1–3% of phosphoric acid is added to the polymer-anhydride mixture.

14. Composition of matter according to claim 10 in which 1–3% of toluene sulfonic acid is added to the polymer-anhydride mixture.

15. A composition according to claim 8 which has been baked from 5 to 30 minutes at 150°–350° F.

16. A mar resistant white enamel comprising a mixture of an oxidized liquid copolymer of butadiene-1,3 and styrene having been air blown to incorporate 10 to 20% oxygen in its structure, 1 to 20% of tetrachlorophthalic anhydride, and 20 volume percent of titanium dioxide, said composition being capable when laid down as 2–4 mil films on a surface and baked for 5 to 10 minutes at 250° to 300° F. of curing to a Sward hardness of at least 32.

17. A mar resistant white enamel comprising a mixture of an oxidized liquid copolymer of butadiene-1,3 and styrene having been air blown to incorporate 10 to 20% oxygen in its structure, 1 to 20% of tetrachlorophthalic anhydride, 1 to 3% of phosphoric acid, and 20 volume percent of titanium dioxide, said composition being capable when laid down as 2–4 mil films on a surface and baked for 5 to 10 minutes at 250° to 300° F. of curing to a Sward hardness of at least 32.

18. A mar resistant white enamel comprising a mixture of an oxidized liquid copolymer of butadiene-1,3 and styrene having been air blown to incorporate 10 to 20% oxygen in its structure, 1 to 20% of tetrachlorophthalic anhydride, 10 to 15% of a final stage melamine-urea formaldehyde resin, and 20 volume percent of titanium dioxide, said composition being capable when laid down as 2–4 mil films on a surface and baked for 5 to 10 minutes at 250° to 300° F. of curing to a Sward hardness of at least 32.

19. A thin formable flat ferrous metal sheet, designed for stamping into precoated container parts, having a baked coating of the product of claim 8 on at least one surface thereof in an amount from 2 to about 8 milligrams per square inch of coated surface.

20. A container comprising a ferrous sheet metal cylindrical body part provided with at least one ferrous sheet metal end-closure sealed to said cylindrical body, the inner surfaces of said container having a baked coating of the product of claim 8 at a dry coating weight of from 2 milligrams to about 8 milligrams per square inch of coated surface.

21. A container comprising a ferrous sheet metal cylindrical body part having a baked coating of the product of claim 8 on the interior surface thereof provided with at least one ferrous sheet metal end-closure sealed thereto, said end-closure having a baked coating of the product of claim 8 on the surface corresponding to an interior surface of said container, said body part and said end-closure each having said coating at a dry coating weight of from 2 to about 8 milligrams per square inch of coated metal surface, said ferrous metal of said body part and said end closure being tin-plated sheet steel having a coating of tin in an amount of .25 to 1.5 pounds of tin per 218 square feet of surface area of said ferrous metal.

References Cited in the file of this patent

UNITED STATES PATENTS

| | | |
|---|---|---|
| 2,316,804 | Musher | Apr. 20, 1943 |
| 2,625,523 | Garber | Jan. 13, 1953 |
| 2,819,302 | Koenecke | Jan. 7, 1958 |
| 2,829,130 | Greenspan | Apr. 1, 1958 |
| 2,836,508 | Canniff | May 27, 1958 |
| 2,856,309 | Gleason | Oct. 14, 1958 |
| 2,871,137 | Aldridge | aJn. 27, 1959 |
| 2,875,919 | Henderson | Mar. 3, 1959 |
| 2,957,786 | Baumhart et al. | Oct. 25, 1960 |